Jan. 25, 1966 P. DAVIDSON 3,231,840
TUNING COIL ARRANGEMENT
Filed April 25, 1962 2 Sheets-Sheet 1
Fig. 7.
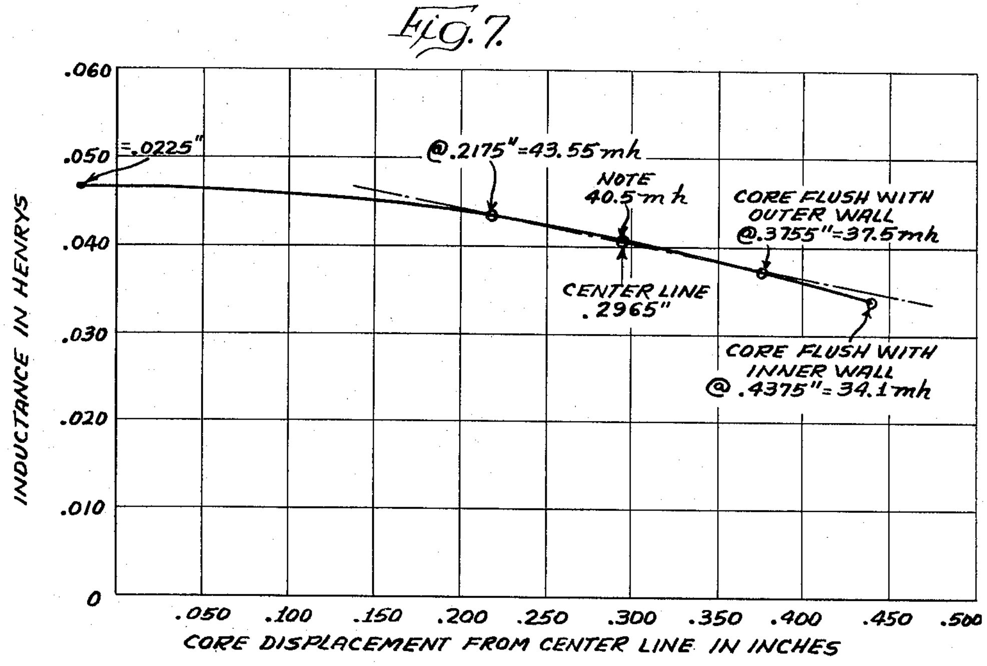
Fig. 6.
| COIL | WIRE SIZE | TOTAL TURNS |
|---|---|---|
| L1 | 35 | 2710 |
| L2 | 35 | 2560 |
| L3 | 35 | 2450 |
| L4 | 35 | 2280 |
| L5 | 34 | 2190 |
| : | : | : |
| L8 | 34 | 1830 |
| L9 | 33 | 1720 |
| : | : | : |
| L12 | 33 | 1450 |
| L13 | 32 | 1380 |
| : | : | : |
| L15 | 32 | 1230 |
| L16 | 31 | 1160 |
| : | : | : |
| L19 | 31 | 980 |
| L20 | 30 | 920 |
| : | : | : |
| L23 | 30 | 770 |
| L24 | 29 | 740 |
| : | : | : |
| L27 | 29 | 620 |
| L28 | 28 | 580 |
| : | : | : |
| L31 | 28 | 490 |
| L32 | 27 | 460 |
| : | : | : |
| L37 | 27 | 360 |
| L38 | 31 | 1090 |
Fig. 1.
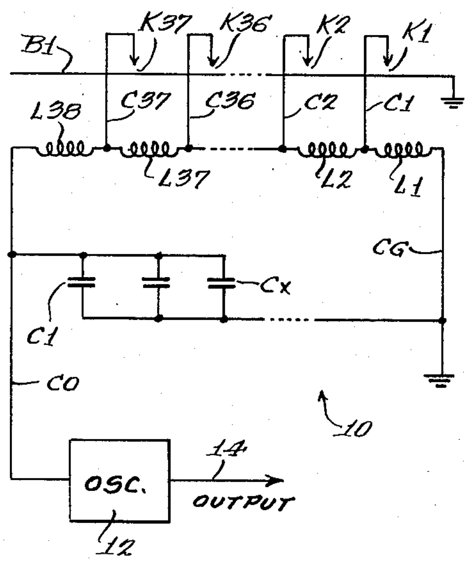
INVENTOR:
Peter Davidson
BY
Wegner, Stradolph & Lore
Attys

TUNING COIL ARRANGEMENT

Filed April 25, 1962 2 Sheets-Sheet 2

INVENTOR:
Peter Davidson
BY
Wupper, Gradolph & Love
Att'ys

United States Patent Office 3,231,840
Patented Jan. 25, 1966

3,231,840

TUNING COIL ARRANGEMENT

Peter Davidson, Chicago, Ill., assignor to Hammond Organ Company, Chicago, Ill., a corporation of Delaware Filed Apr. 25, 1962, Ser. No. 190,035
5 Claims. (Cl. 336—131)

This invention relates in general to oscillator tuning arrangements and more particularly to an improved arrangement for securing certain economies and for permitting improved adjustment and wiring of a plurality of tuning coils selectively connected with an audio oscillator for use in an electronic organ. In general, this invention may be considered to be an improvement upon the arrangement of John M. Hanert Patent No. 2,672,068, granted March 16, 1954, for Electrical Melody Instrument.

A practice sometimes used in electronic organs for generating solo tones is to provide a single oscillator circuit for generating the tones. The oscillator is selectively tuned to different frequencies by changing the inductance in the oscillator circuit. Selection occurs on operation of a key, manual or pedal, by shunting a predetermined number of a group of coils which are connected in series in the oscillator circuit.

In one well-known arrangement, the coils are mounted on a common base so that they are in a physically adjacent position for ease in wiring and handling and each coil is provided with a core generally of magnetic iron laminations. The coils are adjustably related to the cores and each is manually adjusted to a particular position so that the inductance of each coil is controlled to provide a desired frequency. The adjustment of the coils, which constitutes tuning of the instrument, is critical, and since the coil shape is dictated to some extent by the core shape, the coils are wound in a rectangular configuration. In addition, in order to provide the necessary inductance, the cores are generally made quite long, resulting in considerable mutual inductance and an overall low Q.

Because of the inductive effect of the magnetic iron, small changes in the coil positions result in wide frequency changes which make critical adjustment difficult, and since the adjusted position is of course subject to upsetting, such as by twisting of the common base which may occur during shipment, some problem involving stability of tuning is involved. Also as the coils, cores and base create considerable magnetic interaction in part due to the need for supporting the free end of the long cores on the base, considerable detuning of initially tuned coils occurs when successive coils are tuned.

This latter problem is to some extent alleviated by interspersing coils of higher order frequency among coils of lower order. To further reduce the magnetic interaction the coils are often wired so that their fields are in bucking relationship. This may reduce, but does not elimiate the problem and it is still necessary to retune the coils after their initial tuning in order to compensate for changes in the interaction occurring on the tuning of successive coils. The arrangement requires the use of comparatively large quantities of copper in order to secure the necessary inductance and has created a wiring problem, since it is necessary to lace or weave the leads from the lower order coils across leads extending from the higher order coils and vice versa. This approach can of course lead to ultimate success in the instrument, but this success is achieved at considerable cost.

It is therefore an object of the present invention to reduce the amount of copper used in a tuning arrangement comprising a plurality of series connected tuning coils adapted to be selectively interconnected with an oscillator for providing signals at half tone intervals.

It is also an object of the present invention to provide a plurality of connected tuning coils mounted in physically adjacent positions for use in an electronic organ and having inductive interaction of a predetermined nature so as to permit accurate tuning when the core of each coil is adjusted.

It is a further object of the present invention to provide a plurality of serially connected tuning coils mounted in serial order in physically adjacent positions and arranged so that the coil cores may be adjusted individually without detuning other coils and which results in an improved coil Q.

It is a further object of the present invention to provide an improved arrangement of a plurality of serially connected adjustable tuning coils for use in selectively controlling an oscillator and arranged in serial order whereby the cabling and connections between the coils may be simplified.

It is still another object of the present invention to provide a plurality of serially connected tuning coils for use in an organ with each coil having a core whose position is adapted to be adjusted to secure a desired tuning effect.

It is a further object of the present invention to provide an arrangement for tuning a plurality of serially connected coils by means of adjustable cores whose position may be subject to some slight change without appreciably detuning the coils.

It is a further object of the present invention to provide a base structure for carrying a plurality of serially connected tuning coils in adjacent positions on the base with a minimum of magnetic flux coupling therebetween to prevent detuning of the coils occurring because of changes in the interaction, such as might occur on twisting of the base.

It is still a further object of the present innvention to provide an improved bobbin for use in establishing connections between a plurality of serially connected tuning coils arranged in adjacent positions.

Briefly, the main objects of the invention are accomplished by the provision of a series of coils, each wound to the same volume and cylindrical configuration to provide a high substantially identical Q for each coil. A cylindrical ferrite core of identical dimension is provided for each core and is arranged so that its field is sufficiently restricted to minimize interaction and is sufficiently large to provide a desired inductive effect. The inductive effect of the core is in turn also chosen to provide a linear change in inductive effect in a predetermined range of longitudinal movement of a ferrite core along its axis. Since the Q of the coils are all related, each core may be adjusted to the same position in the range which will give linear inductance changes and all the coils will then be tuned. If for some reason, such as failure to hold tolerances, a particular coil is not tuned, an adjustment of its core position may be made without creating a sharp non-linear change in inductive effect so that adjustment may be made over a considerable range in movement. This also aids in preventing detuning such as may occur on inadvertent jarring of the core. Since the coils are wound to provide a high Q and since their magnetic fields are aligned in an aiding direction, the amount of wire necessary to secure a particular inductive effect is reduced, thereby permitting a cumulative copper saving. Also, by properly positioning the cores with respect to the coils, the Q and inductive effect of the coils are maintained at an optimum value, while by controlling its position, interaction is reduced to a minimum.

Also, coils of successive order may be arranged in adjacent positions on the mounting base to permit wiring simplification, since the leads from the respective keys need only be cabled to a respective position and they may also be used to serially connect the coils in the adjacent positions. The mounting base is arranged so that the coils are floatingly mounted thereon to prevent detuning if the base should be twisted or otherwise distorted. In addition, the base structure is so arranged that a minimum of magnetic field is transmitted therethrough from one coil to another.

In order to facilitate wiring the coils so that their fields are aiding, the bobbins are provided with a special cross cut recess therein which permits the leads from opposite terminals to be easily connected to the coil in the adjacent position.

With the above and other objects of the invention in mind, examination of the following specification together with the claims and drawings will reveal other objects and features of this invention.

In the drawings:

FIG. 1 illustrates a relevant circuit portion of an electronic organ monophonic section in which the tuning coil assembly of the present invention is utilized:

FIG. 6 is a chart illustrating the wire sizes and number of turns used to provide the desired identical coil Q; and FIG. 7 is a graph illustrating the change in inductance per incremental movement of the core of a typical coil.

In FIG. 1 of the drawings a monophonic tone generating circuit in which there are provided a plurality of serially connected tuning coils L1–L38 is illustrated by the refrence character 10. It will be seen that there are provided a series of key contacts K1–K37 for 37 notes in the present instance, these for example each being operated by respective playing keys of the pedal or manual keyboard of an organ. The key contacts K1–K37 are operated in conjunction with other contacts associated with the respective keys, but not shown, and each connects ground through a common bus bar B1 and over a respective one of a group of leads C1–C37 to an individually corresponding interconnection between respective coils L1–L38. The coils L1–L38 are all normally connected in series between ground over a conductor CG to an oscillator 12 over a conductor CO. A series of tuning condensers C1–CX are connected between the conductor CO and ground over the conductor CG so as to be in parallel with the coils L1–L38.

When one of the key contacts K1–K37 is operated, one or more of the coils L1–L37 are shunted by the ground on the respective conductor C1–C37 to change the tuning and hence the output frequency of the oscillator 12. This output frequency is applied over the lead 14 to provide a desired tone signal. In addition, the lead CO may also be optionally connected through switch contacts (not shown) to a vibrato or similar circuit and additional capacitors (not shown) may be connected thereto for governing the frequency of the oscillator, but since these are likewise only of incidental relevance to the invention, they are not shown.

Figure 2:
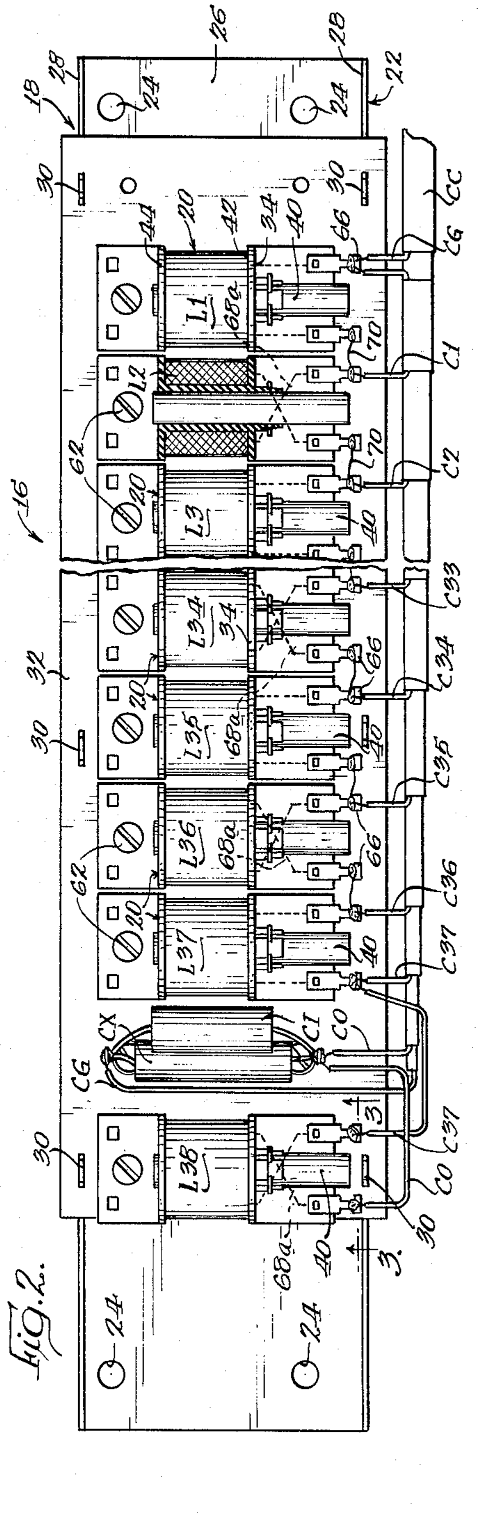
FIG. 2 illustrates a plan view of the tuning coil assembly.
Figure 4:
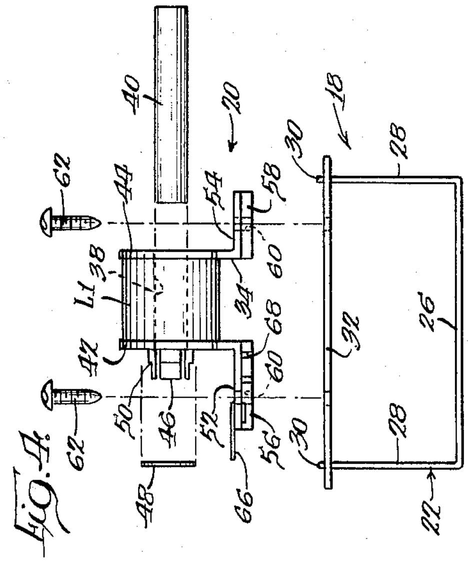
FIG. 4 is an exploded side elevational view of the bobbin and base assembly.
Figure 3:
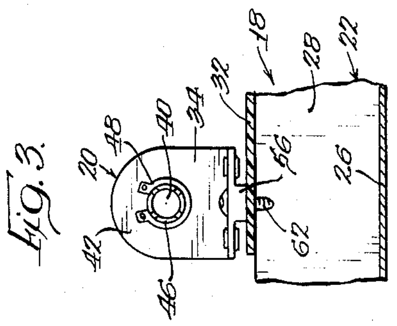
FIG. 3 is a sectional view taken through the line 3—3 of FIG. 2.

It will be appreciated that the coils L1–L38 are all mounted in adjacent positions and that the leads C1–C37, CG and CO must all be extended thereto. The arrangement for mounting the coils and extending connections thereto is illustrated in FIGS. 2, 3 and 4 by a tuning coil assembly 16 and a cable CC.

The tuning coil assembly 16 comprises a base structure 18 upon which are mounted a series of bobbin assemblies 20 in spaced apart position. The base structure 18 comprises an elongate U-shaped channel member 22 having suitable mounting apertures 24 in its back leg 26. The side legs 28 of the channel member each have a series of spaced apart tines 30 upstanding therefrom and these are received in correspondingly shaped apertures of an insulating card 32 for the purpose of floatingly securing the card to the channel member. Many other well known arrangements for securing the card to the channel member may of course be utilized. The card is preferably of phenolic or similar material and one or more may be provided along the length of the channel members for the purpose of supporting the bobbin assemblies 20 and the capacitors C1–CX in spaced apart positions thereon.

Figure 5:
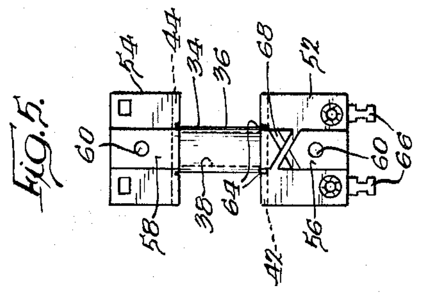
FIG. 5 is a bottom elevational view of the bobbin.

The bobbin assemblies 20 each comprise a bobbin 34 seen independently in FIG. 5 upon which are wound the respective coils L1–L38, and these are arranged in sequential order on the base structure 18 with coil L1 at the right end, for example, and the coil L38 at the left end or vice versa.

The bobbins 34 upon which the respective coils are wound are molded, preferably of a ploycarbonate resin or a material having similar electrical and mechanical characteristics, and all have identical parameters so that the coils my be easily wound to an identical shape and volume. Each bobbin comprises a hollow cylindrical body 36 defiining a cylindrical passageway 38 in which a correspondingly shaped ferrite core tuning element 40 is received. Spool heads 42 and 44 are integrally formed at opposite ends of the body 36 and a portion 46 of the body extends past the head 42. The spacing between the spool heads is .625″ to provide a coil of corresponding length with the coil radius being slightly more than 55% of its length. The coils are wound with an insulated wire slightly less than full on the body 36 and are covered with an outer wrapper of polyester tape. The polycarbonate bobbin reduces moisture absorption and thereby provides improved frequency stability. Both the cylindrical shape of the coils and the coil and core relationships reduce magnetic coupling between adjacent coils from that occurring in the previously described structure.

The portion 46 is split longitudinally at circumferentially spaced apart positions so that it may tightly engage the core 40 when pressure is applied about the periphery of the portion 46. For this purpose a non-ferrous split ring 48 is provided which may be slipped over the end of the portion 46 to compress the same firmly against the core 40. The ring 48 is slid back on the portion until it engages a shoulder 50 thereon. It will be understood that other types of well known securing arrangements may also be used.

The responsive spool heads 42 and 44 are provided with respective integrally formed mounting legs 52 and 54 that project in opposite directions. The mounting legs are in turn provided with integrally formed respective bottom plates 56 and 58 which serve to space the bobbin from the base structure 18. Respective apertures 60 extending through the legs 52 and 54 and the plates 56 and 58 permit the bobbins to be mounted by means of screws 62 to the phenolic card 32 in spaced relationship to the U-shaped channel 22 so that little magnetic flux is passed through the channel.

It will be noted that a pair of grooves 64 extending from the opposite sides of the periphery of the body 36 to respective sides of plate 56 are provided in the spool head 42 so that leads from the coil may be recessed and extended along the sides of the plate 56 to respective terminals 66 provided on leg 52. The plate 56 is provided with an X-shaped recess 68, seen in FIG. 5, with one leg of the X formed deper than the other leg of the X. This permits leads from the coil to be crosed to opposite sides of the plate 56 as shown by the broken lines 68*a* in FIG. 2, while protected and without touching each other, so that they may be connected to opposite terminals. The purpose for this is to facilitate the connection of the coils so as to secure aiding magnetic fields wherefore alternate coils must be so connected as to have opposite flux polarities. In practice, of course, the odd numbered coils may have their connections crossed in the manner shown by broken lines 68*a* in place of the even numbered coils.

It will be noted that the coils are all aligned so that their poles are transverse to the legs of channel 26 and that the channel has no lips or flanges thereon which would disturb any flux path between the respective coil poles. Coil L38 is spaced apart a greater distance from the coil L37 than the separation between the other coils to permit the tuning capacitors C–CX to be mounted therebetween for convenience in extending connections from the leads C1–C37 and to mitigate the possibility of any coupling.

The leads C1–C37 from the keys are contained in cable CC together with the leads CG and CO. The leads CG and C1–C36, it should be observed, are brought out in a simple straightforward sequence from the cable CC for connection to the respective coils L1–L37. The lead CG which must extend both to coil L1 and the tuning capacitors C–CX is provided with a loop at its connection to the incoming terminal of coil L1 so that it may be easily connected to coil L1 while extended through the cable to the ground side of capacitors C–CX. It will also be noted that the coils L1–L38 are connected in sequence to each other by means of the leads C1–C37 which are looped over the adjacent terminals of successive coils as indicated at 70 to provide the ground connection from the respective keys while also serving to serially connect the coils.

This of course permits a tremendous simplification in wiring since it was previously the practice to interspace a higher order coil, for example L20, between coils L1 and L2 with coil L19 preceding coil L1 and coil L21 located between coils L2 and L3. The leads between coils therefore had to pass each other in a very complex arrangement.

It will be noted that the leads C37 and the output lead CO are also brought out of the cable in sequence, but that each is given a preliminary loop for respectively connecting C37 to the output terminal of coil L37 and connecting lead CO to the terminals of capacitors C–CX. The lead C37 is then simply extended to the input terminal of coil L38 while the lead CO is connected to the output terminal of coil L38.

One of the important concepts of the invention relates to the maintenance of a high equal Q for the coils while at the same time reducing the interaction of the fields. The voltage induced in an inductor in a stray field is dependent on the length and thickness of the coil and the length and radius of the core. By making the core diameter small this voltage can be reduced, but the core must still provide the necessary output voltage at resonance. Since the Q of the coil is dependent on the coil configuration, it is desirable to choose a cylindrical configuration in which the thickness of the coil relative to its core diameter is no more than unity, but at the same time the length of the coil relative to the core diameter is greater than unity. In this manner the Q of the coils can be maintained high by making them comparatively short while maintaining the coil length sufficiently high with respect to the core diameter permits sufficient output voltage to be developed at resonance despite the use of a core of small diameter.

In order to equalize the Q between the coils, it is necessary to provide each coil with approximately the same volume of wire. Since the inductance of each coil must have an individual value, the number of turns must be varied accordingly, but without changing the volume and configuration of the ultimate coil. The arrangement for doing this is illustrated by the chart in FIG. 6 where it will be noted that coils with a comparatively high number of turns are wound of smaller diameter wire while coils of a low number of turns are wound with a large diameter wire. A comparatively identical coil volume and Q are therefore maintained. With a substantially identical Q for the various coils and a cylindrical configuration, their inductive relationships can be more easily controlled.

In addition, by the use of the ferrite core 40 a substantially linear change of inductance is provided for a linear movement of the core over a predetermined range as illustrated by the graph in FIG. 7. The graph of FIG. 7 shows the inductance change for relative displacements of the transverse center line of the core from the transverse center line of the bobbin, and it will be noted that between displacements of .2175″ and .3755″ a substantially linear change in inductance between 43.5 and 37.5 millihenries occurs. This range is sufficient to accommodate the total range of tuning and since the inductance changes at a slow linear rate, adjustments may easily be made.

Although the inductance of the respective coils will vary in desired relationship from that shown in FIG. 7, they will all exhibit the same characteristics as far as the displacement of the core. Therefore, each core may be simply inserted in its passageway 38 and moved until it encounters a preset stop set to position the core at, for example, .2965″ lying between the two ends of the linear slope shown in FIG. 7 whereupon each coil is substantially tuned. Some touch up movement of the core may then be required usually if tolerances have been exceeded; however, detuning of adjacent coils does not occur when the cores are adjusted. Further movement of the channel 18 with respect to the coils does not change their tuning and slight jarring of the cores may still not result in detuning since a comparatively large core movement is necessary to detune the coils.

It will be noted that the core diameter is less than .25″, while the total length of the cores is only 1.5″ or approximately two and one half times the coil length and that they protrude from both sides of the coil, although to a greater extent on one side than the other. Their comparatively short length and their positioning contribute to the reduction in mutual coupling while at the same time limiting the core displacement relative to the coil and contribute both to retaining a high inductive effect and high Q. Another factor relating to the reduction in mutual interaction of course relates to the ferrite material itself, which has a lower coefficient of coupling than for example a laminated core.

In the arrangement described, output voltages are approximately 3.5 times that available in the old type of coil arrangement so that the feedback necessary to secure a desired degree of signal amplification is reduced and stability enhanced. Further, the voltage output ratio between the high and low frequencies is only about 6 db in place of about 12 db under the old system so that considerable oscillator stability is provided.

The foregoing being a description of one embodiment of my invention, but believing the invention capable of numerous adaptions including changes in the number of coils used, there is appended hereto a series of claims which are believed to set forth the scope of the invention.

I claim:

1. A bank of successive incremental tuning inductances disposed so that each successive incremental inductance in the bank starting from one end has a higher inductive value than the previous inductance in the bank, said incremental inductances in the bank each comprising substantially identical spool type coil forms, substantially identical axially movable tuning cores for said coil forms, a winding on each of said coil forms having the number of turns necessary to provide the proper incremental inductance when all of said movable cores are in substantially identical positions relative to their coil forms, and the wire sizes for the windings for the individual incremental inductances in the bank being such that the overall physical dimensions of the individual wound inductances are closely similar regardless of the number of turns in the individual windings.

2. The combination called for in claim 1 in which the tuning cores are cylindrical and have a length which is substantially 2.5 times the length of the coils.

3. The combination called for in claim 1 in which the said substantially identical positions for the coil cores is a position which will provide a substantially linear change in inductance per linear change of position of the core.

4. The combination called for in claim 1 in which all of the inductances in said bank are mounted upon a base in side-by-side relation with their cores parallel and substantially equally spaced and with the order of arrangement of the inductances on said base being the order of the value of their inductance.

5. The arrangement called for in claim 4 in which the coils on said base are connected in series with the leads of alternate coils being reversed so that the fields of adjacent coils are in aiding relationship.

References Cited by the Examiner

UNITED STATES PATENTS

| | | | |
|---|---|---|---|
| 2,073,345 | 3/1937 | Johnson | 331—181 |
| 2,480,713 | 8/1949 | Cherry | 331—181 |
| 2,672,068 | 3/1954 | Hanert. | |
| 2,722,663 | 11/1955 | Visch | 336—131 X |
| 2,806,953 | 9/1957 | Krauss | 331—181 X |
| 2,946,029 | 7/1960 | Abrams et al. | 336—136 |
| 2,997,908 | 8/1961 | Hilborn | 84—1.01 |
| 3,077,136 | 2/1963 | Hammond | 84—1.01 |
| 3,087,110 | 4/1963 | Tomonoh et al. | 331—181 X |
| 3,105,213 | 9/1963 | Richard et al. | 336—136 |

FOREIGN PATENTS

| | | |
|---|---|---|
| 999,881 | 2/1952 | France. |

KATHLEEN H. CLAFFY, *Primary Examiner.*

ARTHUR GAUSS, JOHN F. BURNS, LARAMIE E. ASKIN, *Examiners.*